(12) United States Patent
Mugica Elorza et al.

(10) Patent No.: US 9,108,143 B2
(45) Date of Patent: Aug. 18, 2015

(54) ETHYLENE ABSORPTION FILTER FOR REFRIGERATED SPACES

(71) Applicant: OZEANO URDINA, S.L., Mungia (ES)

(72) Inventors: Pablo Mugica Elorza, Mungia (ES);
Inigo Alonso Echevarria, Mungia (ES)

(73) Assignee: OZEANO URDINA, S.L., Mungia (Vizcaya) (ES)

( * ) Notice: Subject to any disclaimer, the term of this patent is extended or adjusted under 35 U.S.C. 154(b) by 0 days.

(21) Appl. No.: 14/354,420

(22) PCT Filed: Oct. 3, 2012

(86) PCT No.: PCT/ES2012/000254
§ 371 (c)(1),
(2) Date: Apr. 25, 2014

(87) PCT Pub. No.: WO2013/060907
PCT Pub. Date: May 2, 2013

(65) Prior Publication Data
US 2014/0305307 A1    Oct. 16, 2014

(30) Foreign Application Priority Data

Oct. 25, 2011    (ES) .................................. 201101160

(51) Int. Cl.
*B01D 53/02*    (2006.01)
*A23B 7/152*    (2006.01)
*A23L 3/3427*    (2006.01)
*B01D 53/04*    (2006.01)
*B01D 53/72*    (2006.01)
*B01D 53/82*    (2006.01)

(52) U.S. Cl.
CPC ................ *B01D 53/02* (2013.01); *A23B 7/152* (2013.01); *A23L 3/3427* (2013.01); *B01D 53/0415* (2013.01); *B01D 53/72* (2013.01); *B01D 53/82* (2013.01); *B01D 2251/10* (2013.01); *B01D 2253/108* (2013.01); *B01D 2253/25* (2013.01); *B01D 2257/704* (2013.01); *B01D 2257/7022* (2013.01); *B01D 2258/06* (2013.01)

(58) Field of Classification Search
CPC ............... A23B 7/152; B01D 2251/10; B01D 2253/108; B01D 2253/25; B01D 2257/7022; B01D 2257/704; B01D 2258/06; B01D 3/02; B01D 3/0407
See application file for complete search history.

(56) References Cited

U.S. PATENT DOCUMENTS

| | | |
|---|---|---|
| 3,698,562 A | 10/1972 | Farrow |
| 5,015,375 A | 5/1991 | Fleck |
| 6,096,207 A | 8/2000 | Hoffman |

FOREIGN PATENT DOCUMENTS

| | | | |
|---|---|---|---|
| ES | 8604080 A1 | 6/1986 | |
| ES | 2228247 A1 | 4/2005 | |
| FR | 2525863 A2 | 11/1983 | |
| WO | WO2007/006398 A1 * | 1/2007 | ................ C07C 2/12 |

* cited by examiner

*Primary Examiner* — Christopher P Jones
(74) *Attorney, Agent, or Firm* — Lucas & Mercanti, LLP

(57) ABSTRACT

The present invention relates to an ethylene absorption filter for refrigerated spaces, comprising an inner granulate (2), a perforated tubular body (3) and a mesh cover (4), the perforated tubular body (3) being stiff and being provided with a distribution of holes (5) having an elongate form, the smallest dimension of said holes (5) being equal to or less than 1.5 mm and the largest dimension thereof being at least 45% greater than the smallest dimension.

2 Claims, 3 Drawing Sheets

ETHYLENE ABSORPTION FILTER FOR REFRIGERATED SPACES

CROSS-REFERENCE TO RELATED APPLICATIONS

This application is a 371 of PCT/ES2012/000254 filed Oct. 3, 2012, which in turn claims the priority of ES P201101160 filed Oct. 25, 2011, the priority of both applications is hereby claimed and both applications are incorporated by reference herein.

FIELD OF THE ART

The present invention relates to an ethylene absorption filter for processes for transporting fruits, vegetables, garden produce, flowers and perishable products in refrigerated spaces for the purpose of removing ethylene gas and other damaging gases (ethanol, acetaldehyde . . . ) that are produced by fruits, garden produce, flowers and perishable products, as well as the spores and microorganisms present in the atmospheres thereof which lead to ripening and deterioration of the transported perishable products.

STATE OF THE ART

Plant products (fruits, garden produce and flowers) are transported today in confined refrigerated spaces, such as refrigerated containers, refrigerated holds in boats, refrigerated trucks, etc., where an atmosphere with ethylene gas, spores, microorganisms, humidity and various gases inducing ripening and deterioration of the perishable products, reducing their post-harvest lifetime, is produced due to the characteristics typical of plant products.

To avoid this problem, ethylene absorption filters arranged inside confined refrigerated spaces in which plant products (fruits, garden produce and flowers) are transported are conventionally used.

Such ethylene absorption filter that is used today is generally made up of support means and a filtration material supported by the support means.

The filtration material is usually a granulate consisting of clays (zeolite, sepiolite, alumina, diatomaceous stone, etc.) or mixtures of clays, impregnated with potassium permanganate or sodium permanganate (it can also be lithium permanganate or other permanganates).

The support of the filtration material can be:

Rectangular shields that are secured to the roof of the refrigerated space, separated, from the evaporator or cooling equipment.

Cylindrical tubes that are secured with flanges to the grating of the evaporator or cooling equipment.

The system that has proven to be most efficient over time are cylindrical tubes, because greater passage of air through the filtration material is assured, which results in higher efficiency of the filter.

The most common filters with cylindrical tubes on the market have the following structure:

An outer cover-like mesh made of "Diamond net" type semi-rigid or flexible plastic, i.e., the holes are rhomboid-shaped. This part is called the outer mesh. In order for a mesh cover to be considered as such, it must perform an effective pre-filtration function, so the smallest dimension thereof, regardless of the shape it has, must be at least 2 mm, and it can have diamond-, rhomboid-, quadrangular- or rectangular-shaped holes. Although it is ideally flexible, it can sometimes be semi-rigid or stiff.

A filter core arranged right inside the cover. This core is a cylindrical tube and it must have a certain degree of stiffness; semi-rigid but not altogether flexible solutions being known. There are a number of both metal and plastic materials that have been used up until now for forming this core. This core has throughout a framework of through holes (mesh) through which the air to be filtered must pass. This core shall be referred to hereinafter as perforated tubular body.

The holes of the perforated tubular body can be rhomboid-shaped, quadrangular-shaped, triangular-shaped, rectangular-shaped, etc., there not being a generalized pattern shape. The filters that have been disclosed in more prior art documents up until now have a tubular body with rhomboid-shaped holes, just like the outer mesh cover, but with thickness and stiffness that are greater than the thickness and stiffness of the outer mesh cover (but without being completely stiff).

Other filters that are not disclosed as much in the prior art are known to not have this double outer mesh cover and perforated tubular body structure, but rather they have as a support for the filtration material, a single cylindrical plastic, semi-rigid or flexible mesh, or a perforated tubular body, but not a combination of both elements. It has been demonstrated that these filters have a higher effect on staining of refrigerated spaces of application.

This is because said filters have the following problems:

Since the filtration material is made up of a granulate of clays impregnated with a permanganate, when the permanganate comes into contact with the drops of water of condensation, the permanganate dissolves in the water and, given that permanganate has a highly corrosive purple color, these conditions are transferred to the drops of water, so said drops get stained and turn a violet color, becoming highly corrosive.

For example, intense condensations are sometimes generated in refrigerated containers, such that a large amount of water passes through the cooling equipment, coming into contact with the filtration material and, under those conditions, when the permanganate dissolves in the water of condensation, the "stained" water is driven either towards the cases of fruit, leaving a purple color on the fruit and/or on the cases, or towards the inside of the cooling equipment, causing corrosion due to the strong oxidation effect caused by permanganate.

This is one of the most significant problems that manufacturers of ethylene absorption filters for refrigerated containers face today because the affected cases of fruit must be disposed of and the affected cooling equipment must be frequently repaired or replaced.

Since there is an ever-growing number of refrigerated containers equipped with these ethylene absorption filters formed by cylindrical tubes, manufacturing companies are realizing the importance of being able to provide a filter that minimizes this problem to the greatest extent possible, without it entailing a decrease in filter effectiveness.

There have been three different types of studies known up until now for solving this problem in accordance with the following:

Study of the water absorption capacity of the granular filtration material. In other words, granulates absorbing 70% of their weight in water will have a less serious dripping problem than those absorbing 40% of their weight in water. To that end, it is necessary to play around with the compositions of the different granulates in order to find formulations incorporating clays with greater water absorption properties, without this entailing a decrease in ethylene gas absorption capacity and rate, which is ultimately the main function of the filter.

Study of the materials of the filtrating mesh cover such that there are materials that are gas, but not water permeable. In this sense, the use of a non-woven fabric has been studied, but the gas barrier is very strong, so it makes this system ineffective because it reduces filter efficiency with respect to ethylene absorption.

Study of systems separating the filter from the cooling equipment, such that the filter does not come into contact with the cooling equipment. In addition to considerably complicating the installation, this solution always has space limitations, and it furthermore also negatively affects operation of the filter as such as it moves it away from the cooling equipment.

As a result, these three types of study are not valid enough to eliminate or to at least sufficiently reduce the existing problems.

It has now been discovered that by maintaining the most common filter structure to date, i.e., structure formed by an outer mesh cover and a perforated tubular body, the definition of the holes or perforations of the framework (mesh) of the perforated tubular body, combined with the completely stiff feature thereof, is extremely important when minimizing the dripping problem, with its "staining" and corrosion consequences, without decreasing filter effectiveness.

Object of the Invention

The present invention proposes an ethylene absorption filter which can be applied in processes of transporting fruits, garden produce, flowers and perishable products in refrigerated spaces, such as refrigerated containers, refrigerated holds in boats, refrigerated trucks, and generally any closed and cooled space intended for transporting fruits and garden produce.

This filter object of the invention comprises a perforated tubular body inside which there is housed a filtrating granulate, said perforated tubular body being covered with a mesh cover.

According to the invention, the perforated tubular body is completely stiff and has a regular framework of holes having an elongate form in which the width is less than 1.5 mm and the length is significantly greater, thus favoring good passage of air, favoring filter effectiveness, and at the same time a reduced passage of water, also filtering the passage of water.

Satisfactory results have been obtained in a range of measurements in which the smallest dimension of said holes of the stiff perforated tubular body is equal to or less than 1.5 mm, and the largest dimension is at least 45% greater than said smallest dimension. Such that, for example, if the smallest dimension is 1.1 mm, the largest dimension is at least 1.595 mm.

In principle, these determining factors in hole measurement affect both the outer face and the inner face of the perforated tubular body. Since the through holes pass through the wall of the perforated tubular body, the thickness of said wall is an extremely important variable itself because it relates to the stiffness and has a specific weight in the dripping problem (greater stiffness, less dripping) and because for certain thicknesses thereof, the holes on the outer surface of the perforated tubular body can be somewhat larger than those on the inner surface, so the hole measurement range must be considered in relation to at least the inner surface of the perforated tubular body.

The simplest shape for said holes of the perforated tubular body is rectangular-shaped, but without altering the essence of the invention, the holes can be of any other shape, such as diamond-shaped, rhomboid-shaped, regular or irregular polygonal-shaped, oval-shaped or ovoid-shaped, mixtilinear-shaped, etc., provided that it complies with the premise that each hole has an elongate form, at least in relation to the inner surface of the perforated tubular body, the smallest dimension being equal to or less than 1.5 mm and the largest dimension being at least 45% greater than the measurement of the smallest dimension (being able to be even greater).

The smallest dimension will correspond to the lowest of the measurements of the shape of the holes; the smallest dimension in a triangular or trapezium shape being able to be the dimension of the base or the dimension of the height, according to the shape. However, in an oval or diamond shape, the smallest dimension will be the dimension of the minor axis; the shape of the holes being able to be oriented with their smallest dimension both in the longitudinal direction and in the transverse direction of the perforated tubular body.

It must also be pointed out that although the perforated tubular body has been defined as a cylindrical body because it is the preferred configuration, the essence of the invention would not be altered if said perforated tubular body was not cylindrical and were to adopt another shape in its stead, such as a prismatic or oval shape, for example, the mesh cover accordingly adopting that same shape.

The results obtained with the embodiment of the filter according to the proposed features show that the "staining" and corrosion effects produced are significantly less than with conventional filters that have the same function.

DETAILED DESCRIPTION OF THE INVENTION

Figure 4:
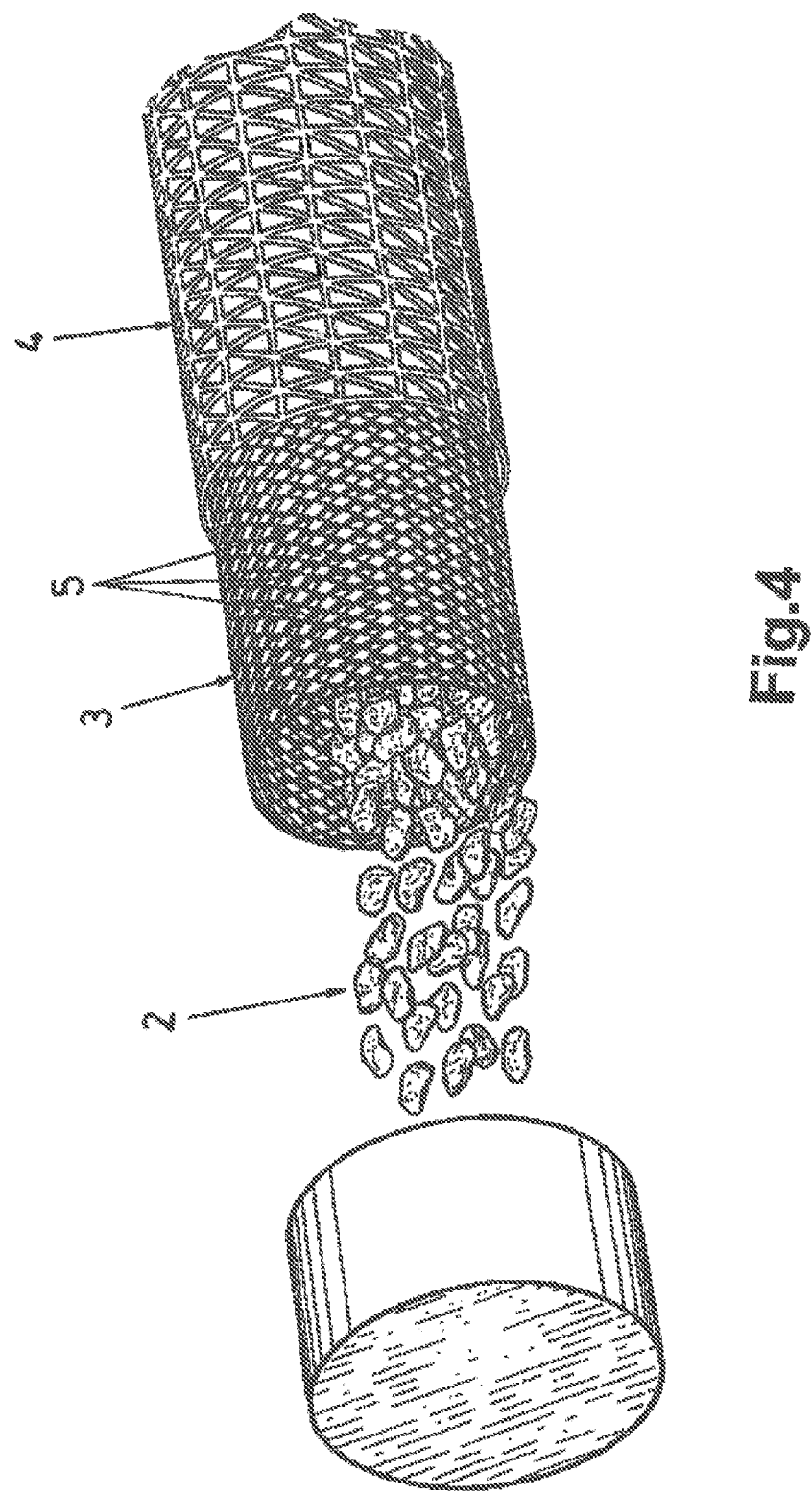
FIG. 4 shows an exploded perspective view of the formation of an ethylene absorption filter carried out according to the invention, showing the parts making up the filter.

The object of the invention relates to an ethylene absorption filter (1) intended for being applied in refrigerated spaces for transporting fruits, garden produce, flowers and perishable products, said filter (1) being made up of an inner granulate (2), a perforated tubular body (3) and a mesh cover (4), as can be seen in FIG. 4.

The granulate (2), which is located inside the perforated tubular body (3), is formed by a porous substrate and impregnation.

The porous substrate that is used for forming the granulate (2) can be made of the following materials:

Diatomaceous earth;
All different types of natural or synthetic zeolites;
Molecular sieve;
Celite;
Perlite;
Aluminas and activated aluminas;
Mica;
Magnesium aiuminate;
Aluminosilicate;
Magnesium silicate;
Activated carbon;

Absorbent clays, such as bentonite, sepiolite, attapulgite, vermiculite, etc.
Kaolin;
Activated bauxite;
Silica gel;
Mixtures of the preceding materials.

The percentage of impregnation on the porous substrate can vary and said impregnation can be of the following types:
Potassium permanganate;
Sodium permanganate;
Lithium permanganate;
Magnesium permanganate;
Calcium permanganate;
Barium permanganate;
or any other purple-colored permanganate.

Other possibilities for forming the granulate (2) can be:
Combining impregnated substrates and non-impregnated substrates (from among the aforementioned substrates).
Adding other chemical compounds as impregnating agents (for example bicarbonate), provided that a permanganate is added.
Combining substrates impregnated with permanganate (and additionally other chemical compounds) with substrates with other impregnations (such as KOH, NaOH . . . )
Combining the different possibilities described above (i.e., three or more classes of granulates could be combined together).

In turn, the perforated tubular body (3) is stiff and has a distribution of holes (5) having an elongate form, said holes (5) being determined with the smallest dimension equal to or less than 1.5 mm and with the largest dimension at least 45% greater than the smallest dimension.

For practical ethylene absorption function for which the filter (1) is intended, to remove ethylene, spores, microorganisms and other gases inducing and accelerating the ripening and deterioration of fruits, vegetables, flowers or perishable products from the atmosphere of refrigerated enclosures in which such products are transported, said filter (1) must comprise at least the inner granulate (2), the stiff perforated tubular body (3) and a (stiff, semi-rigid or flexible) mesh cover (4), or several mesh covers, or a mesh cover (4) must also be arranged on the outside of the perforated tubular body (3) and another one on the inside thereof, without altering the concept of the invention.

Figure 1:
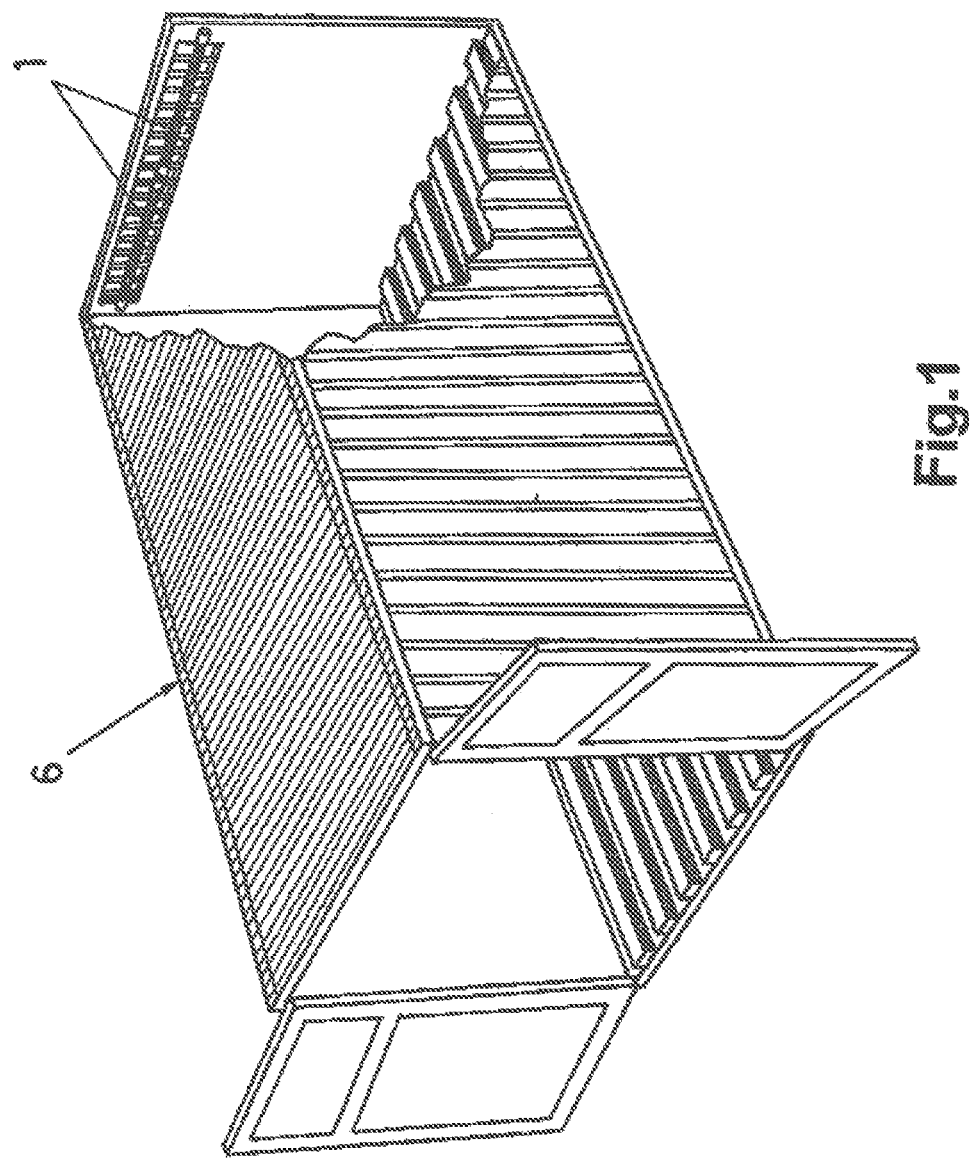
FIG. 1 shows a container for transporting plant products in which ethylene absorption filters may be arranged.
Figure 2:
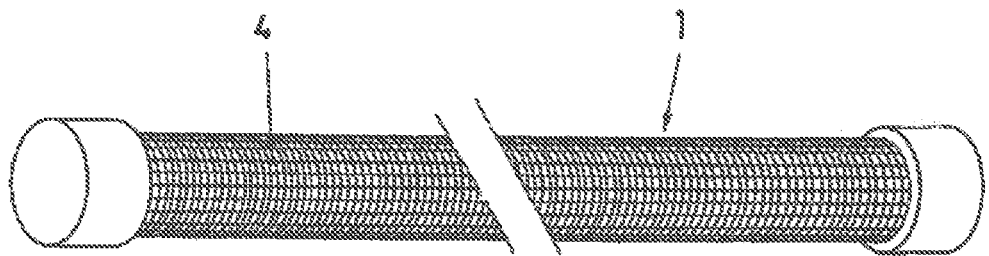
FIG. 2 shows a perspective view of an ethylene absorption filter carried out according to the invention
Figure 3:
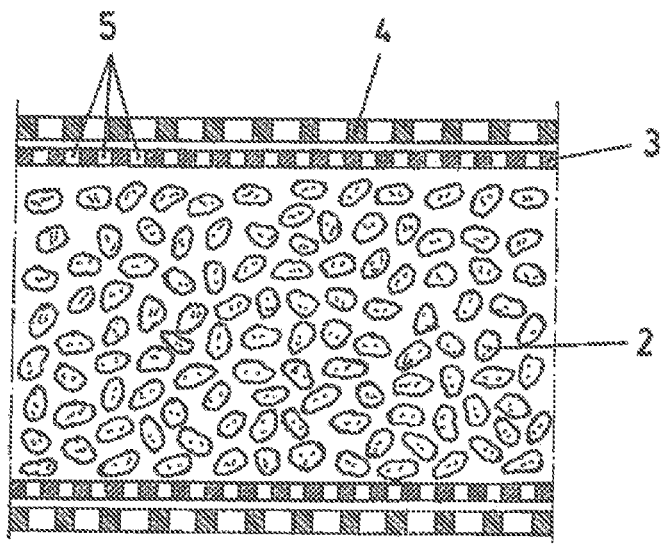
FIG. 3 shows a sectional view of an enlarged detail of the filter in the preceding figure.

For the function of application for which it is intended, the filter (1) is arranged inside the refrigerated space of application, which can be, for example, a container (6) of the type used for transporting fruits and garden produce, as seen in FIG. 1, but it can be any other type of refrigerated enclosure for transporting such products, such as holds in boats, etc.; one or more filters (1) can be arranged at the cold air outlet or anywhere else in the enclosures of application.

The invention claimed is:

1. An ethylene gas absorption filter with reduced water passage for refrigerated spaces, comprising an inner granulate, a perforated tubular body and a mesh cover, wherein the perforated tubular body is stiff and has a distribution of holes having an elongate form, the smallest dimension of said holes being equal to or less than 1.5 mm and the largest dimension thereof being at least 45% greater than the smallest dimension.

2. The ethylene absorption filter for refrigerated spaces according to claim 1, wherein the holes of the perforated tubular body are arranged with their smallest dimension oriented in the longitudinal or transverse direction of said perforated tubular body.

* * * * *